(12) United States Patent
Gueissaz

(10) Patent No.: US 10,488,824 B2
(45) Date of Patent: Nov. 26, 2019

(54) DETECTOR CIRCUIT FOR AN INDUCTIVE DISPLACEMENT SENSOR, IN PARTICULAR FOR A TOUCH PLATE

(71) Applicant: The Swatch Group Research and Development Ltd, Marin (CH)

(72) Inventor: Francois Gueissaz, Cormondreche (CH)

(73) Assignee: The Swatch Group Research and Development Ltd, Marin (CH)

( * ) Notice: Subject to any disclaimer, the term of this patent is extended or adjusted under 35 U.S.C. 154(b) by 335 days.

(21) Appl. No.: 15/453,240

(22) Filed: Mar. 8, 2017

(65) Prior Publication Data
US 2017/0277134 A1 Sep. 28, 2017

(30) Foreign Application Priority Data
Mar. 24, 2016 (EP) .................................. 16162293

(51) Int. Cl.
*G04F 10/00* (2006.01)
*A63B 71/06* (2006.01)
*G01D 5/20* (2006.01)

(52) U.S. Cl.
CPC .......... *G04F 10/00* (2013.01); *A63B 71/0686* (2013.01); *G01D 5/20* (2013.01); *G01D 5/202* (2013.01); *G01D 5/2006* (2013.01); *G01D 5/2013* (2013.01)

(58) Field of Classification Search
CPC ........ G01D 5/20; G01D 5/202; G01D 5/2006; G01D 5/2013
See application file for complete search history.

(56) References Cited

U.S. PATENT DOCUMENTS

| 7,304,292 | B2 * | 12/2007 | Nakamoto ............. G01D 3/036 250/214 R |
| 2002/0167439 | A1 | 11/2002 | Bloch et al. |
| 2005/0275568 | A1 | 12/2005 | Madni et al. |
| 2012/0326760 | A1 | 12/2012 | Kesselring et al. |

FOREIGN PATENT DOCUMENTS

| DE | 10 2008 063 936 A1 | 6/2010 |
| EP | 1 248 369 A2 | 10/2002 |
| EP | 1 600 741 A2 | 11/2005 |

OTHER PUBLICATIONS

European Search Report dated Sep. 7, 2016 in European Application 16162293.1 of Mar. 24, 2016 (with English Translation of Categories of Cited Documents).

* cited by examiner

*Primary Examiner* — Hai L Nguyen
(74) *Attorney, Agent, or Firm* — Oblon, McClelland, Maier & Neustadt, L.L.P.

(57) ABSTRACT

A detector circuit for detecting a variation in inductance of the magnetic circuit of an inductive displacement sensor, the detector circuit including: a first flip flop arranged to supply a first signal including a voltage pulse of necessary and sufficient duration to charge a coil to a threshold current, wherein the first signal is applied to a first terminal of the coil; a pulse generator configured to supply a reference signal comprising a reference pulse; a clock signal generator arranged to trigger the voltage pulse and the reference pulse periodically and simultaneously; and a second flip flop arranged to generate an output signal taking a status of the first signal on a trailing edge of the reference pulse.

8 Claims, 2 Drawing Sheets

1

DETECTOR CIRCUIT FOR AN INDUCTIVE DISPLACEMENT SENSOR, IN PARTICULAR FOR A TOUCH PLATE

CROSS-REFERENCE TO RELATED APPLICATION

This application claims priority from European Patent application 16162293.1 of Mar. 24, 2016, the entire disclosure of which is hereby incorporated herein by reference.

FIELD OF THE INVENTION

The invention relates to a detector circuit for an inductive displacement sensor.

BACKGROUND OF THE INVENTION

Such a sensor is used, for example, to detect a pressure of a swimmer on a plate of a timing system for swimming competitions referred to as a touch plate. A plate of this type is secured to the finishing wall of the swimming pool and a pressure of a swimmer on the touch plate causes the plate to come closer to the wall. When this approach movement is detected by the sensor, the chronometer measuring the swimmer's time stops or records an intermediate time.

Inductive displacement sensors usually comprise a coil excited by a high-frequency alternating current supplied by a detector circuit. The proximity of an electrically conductive or ferromagnetic part with the coil causes a loss within the magnetic circuit formed by the coil, the part and air gap separating them, or/and modifies the inductance of the coil. The measurement of loss in the circuit or of a variation in this inductance thus allows a displacement of the part in relation to the coil to be identified.

The disadvantage of this type of detector circuit is that current is being permanently consumed there. There is therefore a need for a detector circuit of lower consumption, which allows indication that a loss threshold in the magnetic circuit or its inductance has been exceeded (threshold value corresponding, for example, to a pressure of a swimmer on a touch plate).

SUMMARY OF THE INVENTION

The aim of the present invention is to respond to the need raised above.

For this purpose, the invention relates to a circuit for detecting a variation in inductance of the magnetic circuit of an inductive displacement sensor, wherein the detector circuit comprises:

a first flip flop arranged to supply a first signal comprising a voltage pulse of necessary and sufficient duration to charge the coil to a threshold current, wherein the first signal is applied to a first terminal of the coil a pulse generator configured to supply a reference signal comprising a reference pulse a clock signal generator arranged to trigger the charge pulse and the reference pulse periodically and simultaneously a second flip flop arranged to generate an output signal taking the status of the first signal on the trailing edge of the reference pulse.

In a known manner an inductive displacement sensor, more precisely a displacement sensor of variable inductance, comprises a fixed ferromagnetic part integrating a coil. When a ferromagnetic part that is movable in relation to the fixed part is located close to the fixed part, a magnetic circuit comprising the fixed part and the movable part in series with an air gap closes. The reluctance R of the magnetic circuit is equal to the sum of the reluctances of the segments formed by the fixed (f), movable (m) parts and the air gap (e), i.e. $L_f/\mu_0\mu_f S_f + L_m/\mu_0\mu_m S_m + L_e/\mu_0 S_e$, where L represents the length of the segment of magnetic circuit, $\mu$ its relative magnetic permeability, S its section and pa the magnetic permeability of vacuum. It is thus understood that the reluctance of the magnetic circuit varies proportionally to the length of the air gap, i.e. to the spacing between the movable part and the fixed part. The shorter the air gap, the lower the reluctance of the magnetic circuit and the higher the inductance of the coil.

According to the invention and contrary to practice in the state of the art, the coil is not excited by a high-frequency alternating current, but by a string of charge pulses. More precisely, an electric voltage is periodically applied by a first flip flop BD1 to the coil placed in the variable reluctance magnetic circuit. At the moment of application of this voltage to the coil the current in the coil begins to increase at a given rate of $RU/N^2$, where R represents the reluctance of the magnetic circuit, U the applied voltage and N the number of turns of the coil.

The higher the inductance, the longer the duration of the charge pulse necessary to reach a fixed current value will be, and vice versa.

The cyclic ratio of the charge pulses is substantially less than 1% and allows a sensor with a low energy consumption to be obtained. Each charge pulse represents a power consumption of less than one nanojoule, i.e. a consumption of less than 10 microwatts. The consumption of a sensor assembly on a touch plate is therefore limited. Moreover, supposing that these charge pulses are repeated at a frequency of more than 10 000 Hertz, a sensor having a latency of less than 100 microseconds can be obtained.

The second flip flop BD2 acts as a comparator between the duration of the reference pulse and the duration of the charge pulse. If the inductance is low, the charge pulse is terminated at the trailing edge of the reference pulse. Conversely, if the inductance is high, the charge pulse is still in progress on the trailing edge of the reference pulse. The detector circuit therefore enables an output signal indicating whether the inductance is higher than a threshold value to be supplied.

Moreover, the detector circuit according to the invention may comprise one or more of the following features in all technically possible combinations.

In a non-restrictive embodiment the detector circuit comprises a comparator arranged and configured to supply a third signal that changes status when the second signal observed at a second terminal of the coil exceeds a first comparison threshold, the first flip flop being arranged so that said change of status causes the termination of the charge pulse.

In a non-restrictive embodiment the first flip flop is a flip flop comprising:

a first asynchronous input SET subject to the clock signal a second asynchronous input CLEAR subject to the third signal.

In a non-restrictive embodiment the detector circuit comprises a resistor branched between the second terminal of the coil and the earth of the detector circuit.

In a non-restrictive embodiment the comparator is a Schmitt trigger having an input subject to the second signal.

In a non-restrictive embodiment the pulse generator is arranged and configured so that one of the statuses of the output signal causes a reduction of an initial duration of the reference pulse and the other status causes the reference pulse to return to its initial duration.

In a non-restrictive embodiment the pulse generator comprises:
  a first asynchronous input TRIG subject to the clock pulse
  a second input subject to the output signal.

In a non-restrictive embodiment the second flip flop is a flip flop D comprising:
  a first synchronous input D subject to the first signal
  a second input CLK subject to the reference signal.

SUMMARY OF THE DRAWINGS

Other special features and advantages will become clear from the following description given by way of non-restrictive example with reference to the attached drawings.

DETAILED DESCRIPTION OF THE PREFERRED EMBODIMENTS

Figure 1:
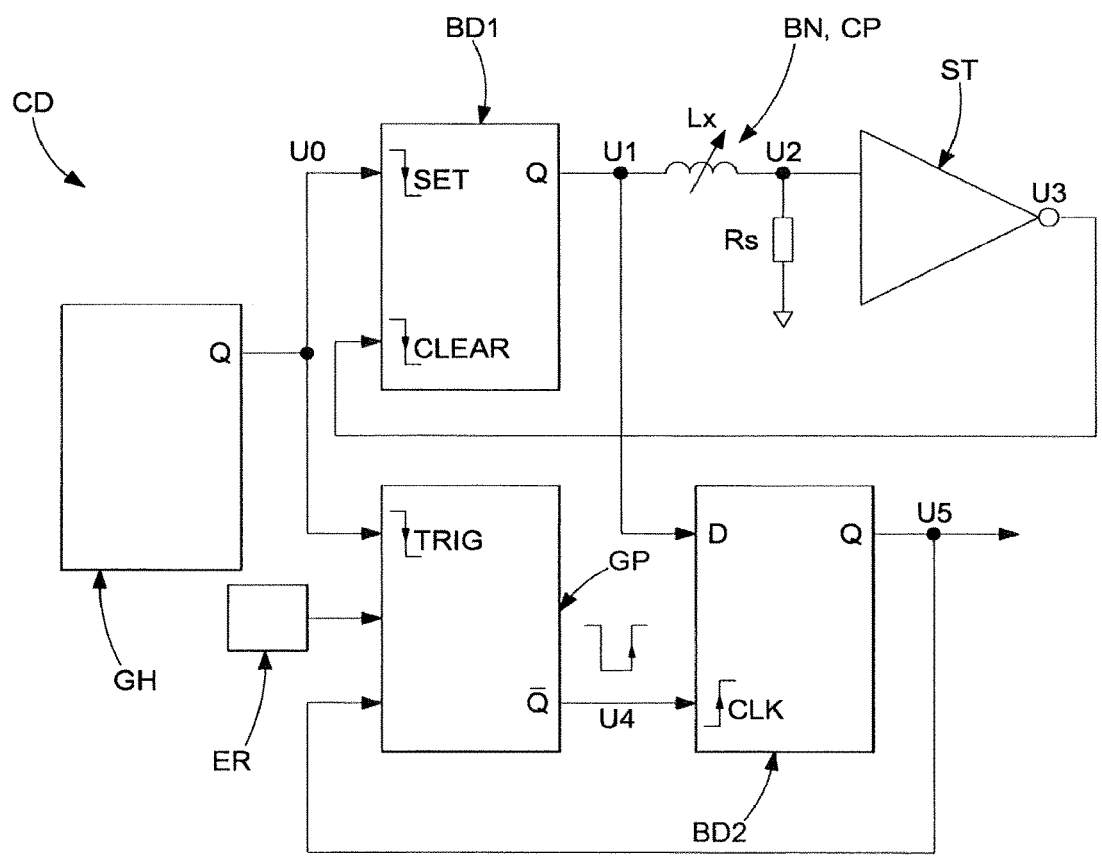
FIG. 1 shows a circuit for detection of a variation of inductance of a coil connected to the terminals of said coil

FIG. 1 shows the detector circuit CD according to the invention. The detector circuit CD is capable of generating a binary output signal U5 according to the inductance Lx of a variable inductance coil BN, wherein said coil BN forms part of an inductive displacement sensor CP. More precisely, the detector circuit CD is such that the output signal U5 assumes a high value if the inductance Lx is higher than a first inductance threshold Lon and a low value if the inductance Lx is lower than a second inductance threshold Lon-dL.

The detector circuit CD has a clock signal generator GH capable of generating a clock signal U0. The frequency of the clock signal U0 is chosen to be inverse to the desired latency of the sensor. For example, if a sensor with a latency of 100 microseconds is desired, the clock signal is chosen at the frequency 10 kilohertz. In fact, as will be clarified below, each stroke of the clock signal U0 triggers an interrogation of the system that potentially leads to detection of a variation in the inductance Lx.

Moreover, the detector circuit CD comprises a first flip flop given the reference BD1 (for example, but not necessarily, a flip flop D or a flip flop SR) that is capable of generating a first binary signal U1 according to the clock signal U0 and a third binary signal U3. More precisely, the clock signal U0 is applied to a first asynchronous input SET of the first flip flop BD1 triggered by a descending edge and the third signal U3 is applied to a second asynchronous input CLEAR of the first flip flop BD1, which is also triggered by a descending edge. Thus, when the clock signal U0 passes to the low status, the first signal U1 passes to the high status, starting up the charge pulse, and when the third signal U3 passes to the low status, the first signal U1 passes to the low status, terminating the charge pulse. A first terminal of the coil BN is subject to the first signal U1.

Furthermore, the detector circuit CD has a resistor Rs connected between the second thermal of the coil BN and the earth of the detector circuit CD. The signal observed on the second terminal of the coil BN is called the second signal U2. The second signal U2 represents the voltage at the terminals of the resistor Rs and is proportional to the current in the coil BN.

Moreover, the detector circuit CD has a Schmitt flip flop ST, also referred to as threshold flip flop or Schmitt trigger, which is capable of generating the third signal U3 as a function of the second signal U2. More precisely, the Schmitt trigger ST compares the second signal U2 with a first comparison threshold Se1 and a second comparison threshold Se2. When the second signal U2 becomes more than the first comparison threshold Se1, the third signal U3 passes to the low status and terminates the charge pulse re-initialising signal U1 at low status via the asynchronous input CLEAR; when the second signal U2 becomes less than the second comparison threshold Se2, the third signal U3 passes to the high status without any effect on signal U1.

In addition, the detector circuit CD has a rectangular pulse generator GP that is capable of generating a reference signal U4 having reference pulses IP4 as a function of the clock signal U0 and the output signal U5. More precisely, the clock signal U0 is applied to a first asynchronous input TRIG of the generator GP triggered by a descending edge so that when the clock signal U0 passes to the low status, the reference signal U4 likewise passes to the low status for a predefined duration in order to form a reference pulse IP4. As will be explained below, the output signal U5 is used to possibly modify the duration of the reference pulses IP4. A predefined initial duration tpw4 as a function of a desired detection threshold for the displacement sensor CP is allocated to the reference pulses IP4, but this duration of the reference pulses IP4 is possibly shortened by a duration dpw as a function of the status of the output signal U5. More precisely, if the output signal U5 is at low status on a descending edge of the clock signal U0, the reference pulses IP4 are of the predefined initial duration tpw4. On the other hand, if the output signal U5 is at high status on a descending edge of the clock signal U0, the reference pulses IP4 are of duration tpw4-dpw.

To adjust the duration tpw4, and thus also the detection threshold of the sensor, the detector circuit CD has an adjusting element ER connected to an input of the pulse generator GP. This is, for example, a resistor of a variable capacity or also of an output value of a digital counter to be programmed.

In addition, the detector circuit CD also has a second flip flop given the reference BD2, of type D for example, which is capable of generating the output signal U5 as a function of the first signal U1 and the reference signal U4. More precisely, the first signal U1 is applied to the synchronous input D of the second flip flop BD2 and the reference signal U4 is applied to the clock input CLK of the second flip flop BD2 running a sampling of the input D. Hence, on the ascending edge of the reference signal U4 the output signal U5 assumes the value of the first signal U1, and when the third signal U3 passes to low status, the first signal U1 likewise passes to low status. This new value of U1 on the input D of BD2 will be visible on U5 at the next reference pulse IP4.

Figure 2:
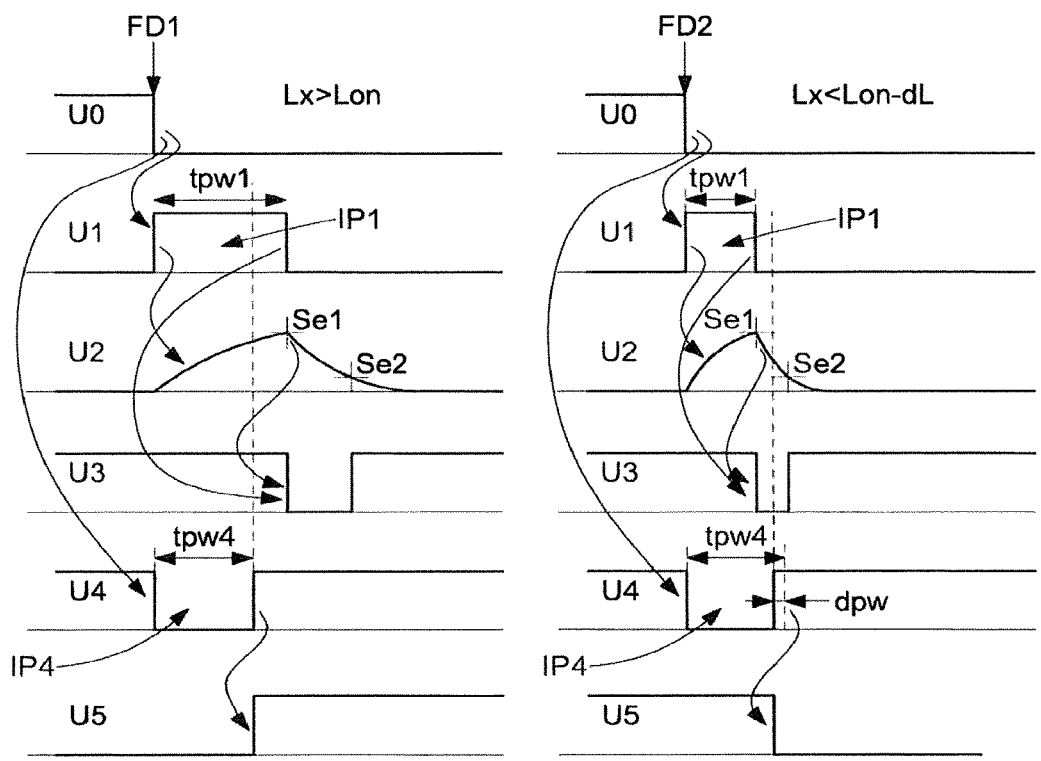
FIG. 2 shows a timing diagram representing the evolution in time of several signals observed at different points of the detector circuit.

To help understand the operation of the circuit, the signals U1 to U5 are represented temporally in FIG. 2. Initially, the inductance Lx of the coil BN is higher than the first inductance threshold Lon. Then, between a first descending edge FD1 and a second descending edge FD2 of the clock signal U0 the inductance Lx of the coil BN becomes less than the second inductance threshold Lon-dL. Let us assume that the clock signal U0 and the reference signal U4 are initially at high status and that the first signal U1 and the second signal U2 are initially at low status, the second signal U2 setting U3 at high status. In addition, let us assume that the output signal U5 is initially at low status. All these initial statuses can easily be set at the start up of the detector device.

On the first descending edge FD1 of the clock signal U0 the first signal U1 passes from low status to high status. The coil BN, then subject to a voltage step, is charged and the voltage at the terminals of the resistor Rs increases, as the second signal U2 shows. When the voltage at the terminals of the resistor Rs increases and reaches the first comparison threshold Se1, the third signal U3 passes from high status to low status. When passing to low status the third signal U3 triggers the passage of the first signal U1 from high status to low status. The coil BN is then discharged and the voltage at the terminals of the resistor Rs decreases down to zero again, as the timing diagram showing the second signal U2 shows. When the voltage at the terminals of the resistor Rs decreases and reaches the second comparison threshold Se2, the third signal U3 passes from low status to high status without any effect on signal U1. The first signal U1 and the second signal U2 then return to their initial low value, whereas the third signal U3 returns to its initial high value.

In parallel, on the first descending edge FD1 of the clock signal U0 the reference signal U4 passes from high status to low status, then after a duration tpw4 once again from low status to high status. When passing to high status, the reference signal U4 triggers the re-copying of the first signal U1 onto the output signal U5. So, since the inductance Lx of the coil BN is initially high, the first signal U1 is still at high status when the reference signal U4 passes to high status again after a duration tpw4. In other words, the duration tpw1 of the rectangular pulse of the first signal U1 is greater than the duration tpw4 of the rectangular pulse of the reference signal U4. Thus, the output signal U5 passes from low status to high status. A variation in inductance is thus detected. If the sensor is associated with a touch plate, it detects that a pressure has been exerted on the touch plate.

Then, the second clock edge FD2 causes the first signal U1 to pass from low status to high status again. Meanwhile, the inductance Lx of the coil BN has become less than the second inductance threshold Lon-dL, the coil BN is therefore faster to charge than before. Hence, the first signal U1 has already passed to low status again when the reference signal U4 passes to high status again after a duration tpw4-dpw (it will be recalled that it was mentioned previously that when the output signal U5 is at high status on a descending edge of the clock signal U0, the reference pulses are of duration tpw4-dpw). In other words, duration tpw1 of the rectangular pulse of the first signal U1 is less than duration tpw4-dpw of the rectangular pulse of the reference signal U4. The output signal U5 then passes from high status to low status.

It is noted that shortening the duration of the reference pulse IP4 when the output signal U5 is at high status enables a stability of the output voltage U5 to be assured in the case where the inductance Lx is higher than the first inductance threshold Lon, but fluctuates randomly because of the electrical noise of the circuit and the mechanical vibrations of the sensor so as to exceed this threshold Lon by moments. Because of the shortening of the reference pulse IP4, it is possible to prevent the output voltage U5 from passing randomly to low status again because of these fluctuations.

The present invention is not, of course, limited to the illustrated example, but is open to numerous variants and modifications that will be clear to the person skilled in the art.

The invention claimed is:

1. A detector circuit for detecting a variation in inductance of the magnetic circuit of an inductive displacement sensor, the detector circuit comprising:
    a first flip flop arranged to supply a first signal comprising a voltage pulse of necessary and sufficient duration to charge a coil to a threshold current, wherein the first signal is applied to a first terminal of the coil;
    a pulse generator configured to supply a reference signal comprising a reference pulse;
    a clock signal generator electrically connected to the pulse generator and to the first flip flop, and being arranged to trigger the voltage pulse and the reference pulse periodically and simultaneously; and
    a second flip flop electrically connected to the first flip flop and to the clock signal generator, and being arranged to generate an output signal taking a status of the first signal on a trailing edge of the reference pulse.

2. The detector circuit according to claim 1, further comprising a comparator arranged and configured to supply a third signal that changes status when a second signal observed at a second terminal of the coil exceeds a first comparison threshold, the first flip flop being arranged so that said change of status causes the termination of the charge pulse.

3. The detector circuit according to claim 2, wherein the first flip flop is a flip flop comprising:
    a first asynchronous input SET subject to the clock signal, and
    a second asynchronous input CLEAR subject to the third signal.

4. The detector circuit according to claim 2, further comprising a resistor branched between the second terminal of the coil and the earth of the detector circuit.

5. The detector circuit according to claim 2, wherein the comparator is a Schmitt trigger having an input subject to the second signal.

6. The detector circuit according to claim 1, wherein the pulse generator is arranged and configured so that one of the statuses of the output signal causes a reduction of an initial duration of the reference pulse and the other status causes the reference pulse to return to an initial duration thereof.

7. The detector circuit according to claim 1, wherein the pulse generator comprises:
    a first asynchronous input TRIG subject to the clock pulse, and
    a second input subject to the output signal.

8. The detector circuit according to claim 1, wherein the second flip flop is a flip flop D comprising:
    a first synchronous input D subject to the first signal, and
    a second input CLK subject to the reference signal.

* * * * *